(12) United States Patent
Mobarak et al.

(10) Patent No.: US 10,129,228 B1
(45) Date of Patent: Nov. 13, 2018

(54) AUTHENTICATED COMMUNICATION BETWEEN DEVICES

(71) Applicant: Amazon Technologies, Inc., Seattle, WA (US)

(72) Inventors: Jason Anthony Mobarak, San Ramon, CA (US); Rajasimman Madhivanan, Sunnyvale, CA (US); Andrew Jay Roths, Redwood City, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 295 days.

(21) Appl. No.: 15/085,777

(22) Filed: Mar. 30, 2016

(51) Int. Cl.
*H04L 29/06* (2006.01)
*H04L 9/32* (2006.01)

(52) U.S. Cl.
CPC .......... *H04L 63/061* (2013.01); *H04L 9/3226* (2013.01); *H04L 9/3242* (2013.01); *H04L 63/083* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 7,162,035 | B1 * | 1/2007 | Durst | G06K 19/086 380/54 |
| 7,454,619 | B2 * | 11/2008 | Smetters | H04L 9/00 380/282 |
| 8,015,597 | B2 * | 9/2011 | Libin | H04L 9/3294 380/277 |
| 2012/0036245 | A1 * | 2/2012 | Dare | G06F 8/60 709/223 |
| 2013/0067552 | A1 * | 3/2013 | Hawkes | H04L 63/166 726/7 |
| 2015/0188949 | A1 * | 7/2015 | Mahaffey | H04L 63/20 726/1 |
| 2015/0372875 | A1 * | 12/2015 | Turon | H04W 76/10 370/254 |
| 2015/0382191 | A1 * | 12/2015 | Muttik | H04W 12/06 455/411 |

(Continued)

OTHER PUBLICATIONS

Liang, Jinjin et al. When HTTPS Meets CDN: A Case of Authentication in Delegated Service. 2014 IEEE Symposium on Security and Privacy. https://ieeexplore.ieee.org/stamp/stamp.jsp?tp=&arnumber=6956557 (Year: 2014).*

(Continued)

*Primary Examiner* — Jeremiah L Avery
(74) *Attorney, Agent, or Firm* — K&L Gates LLP

(57) ABSTRACT

Various examples are directed to systems and methods for establishing a secure, authenticated connection between devices utilizing a password authenticated key exchange. A client may send an encrypted connection request message to a server via a first communication medium. The server may send the client first data token data via a first communication medium. The client may encrypt the first data token with a password-authenticated key, for example, obtained in a password authenticated key exchange with the server. The client may encrypt the first token data based at least in part on the password-authenticated key to generate a message authentication code (MAC). The client may send the MAC to the server.

20 Claims, 6 Drawing Sheets

(56) References Cited

U.S. PATENT DOCUMENTS

| | | | |
|---|---|---|---|
| 2016/0119291 A1* | 4/2016 | Zollinger | H04L 9/3228 713/171 |
| 2016/0119307 A1* | 4/2016 | Zollinger | H04L 63/08 726/4 |
| 2016/0119318 A1* | 4/2016 | Zollinger | H04L 9/0819 713/171 |
| 2016/0366157 A1* | 12/2016 | Smith | H04L 63/06 |

OTHER PUBLICATIONS

Klingsheim, Andre N.; Moen, Vebjorn; Hole, Kjell. Challenges in Securing Networked J2ME Applications. Computer, vol. 40, Issue: 2. https://ieeexplore.ieee.org/stamp/stamp.jsp?tp=&arnumber=4085618 (Year: 2007).*

Hwang, Gwan-Hwan et al. An Operational Model and Language Support for Securing Web Services. IEEE International Conference on Web Services (ICWS 2007). https://ieeexplore.ieee.org/stamp/stamp.jsp?tp=&arnumber=4279632 (Year: 2007).*

Certificate authority, Wikipedia, the free encyclopedia, https://en.wikipedia.org/wiki/Certificate_authority, 9 pages, (last visited Mar. 18, 2016).

Man-in-the-middle attack, Wikipedia, the free encyclopedia, http://en.wikipedia.org/wiki/Man-in-the-middle_attack, 6 pages, (last visited Mar. 18, 2016).

Password Authenticated Key Exchange by Juggling, Wikipedia, the free encyclopedia, https://en.wikipedia.org/wiki/Password_Authenticated_Key_Exchange_by_Juggling, 4 pages, (last visited Mar. 18, 2016).

Self-signed certificate, Wikipedia, the free encyclopedia, https://en.wikipedia.org/wiki/Self-signed_certificate, 2 pages, (last visited Mar. 18, 2016).

* cited by examiner

AUTHENTICATED COMMUNICATION BETWEEN DEVICES

BACKGROUND

Secure communication techniques are used by many different kinds of computing devices to prevent third party devices from reading communications between the computing devices. Discussed herein are technological improvements to such systems.

DETAILED DESCRIPTION

Figure 1:
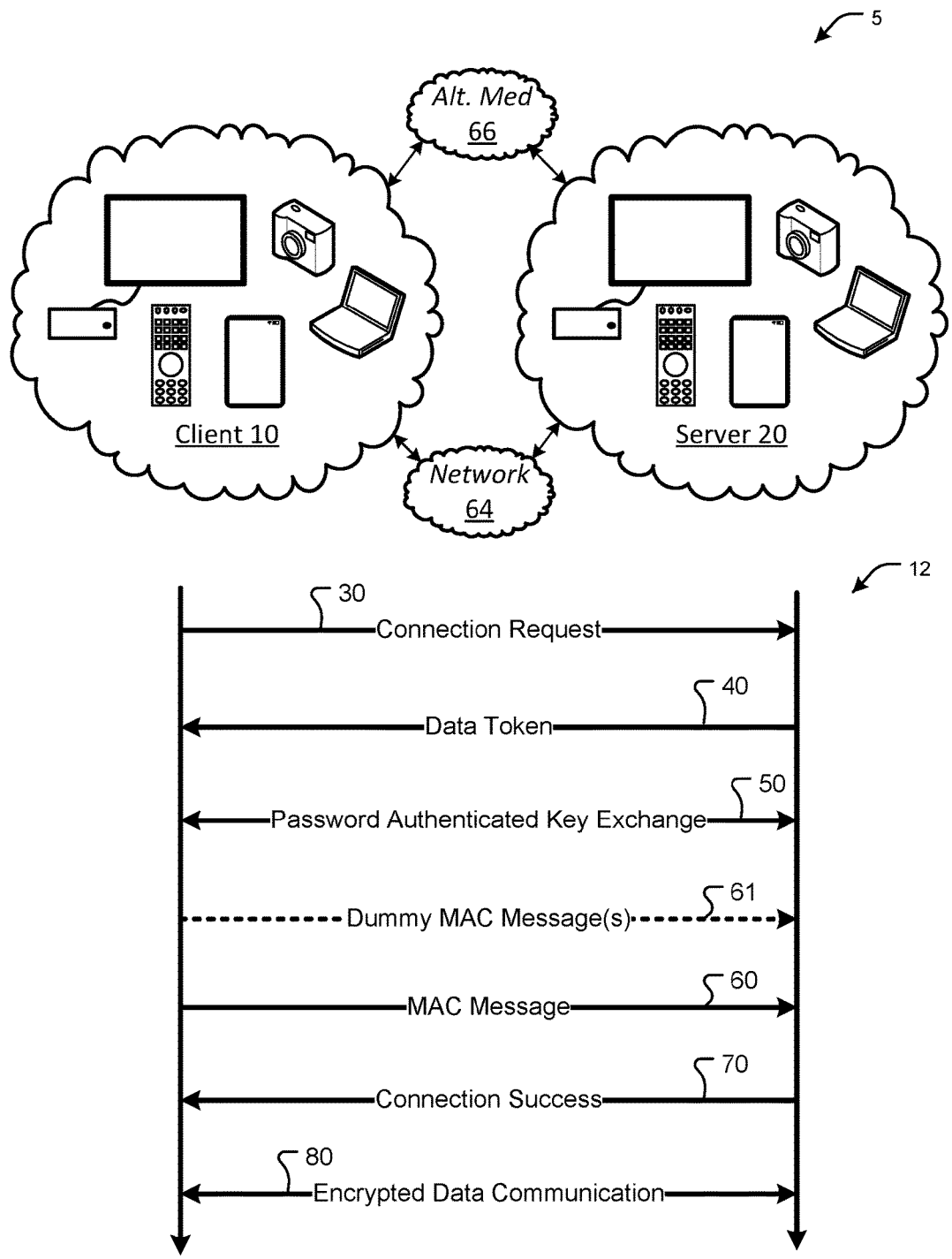
FIG. 1 is a diagram showing one example of an environment for establishing an encrypted connection between devices utilizing a password authenticated key exchange.

In the following description, reference is made to the accompanying drawings, which illustrate several examples of the present disclosure. It is understood that other examples may be utilized and various operational changes may be made without departing from the spirit and scope of the present disclosure. The following detailed description is not to be taken in a limiting sense, and the scope of the embodiments of the present disclosure is defined only by the claims of the issued patent.

Various examples are directed to systems and methods for establishing encrypted connections between devices utilizing a password authenticated key exchange, such as password authenticated key exchange by juggling (JPAKE). Encrypted connections can be used to securely transmit data between devices or applications executing at computing devices. Computing devices and/or executed applications engaged in secure communications are referred to herein generally as servers or clients. A client may encrypt data in a message and send the message to a server. The server may decrypt the data and read the message. The server may be in possession of a cryptographic key that is used to decrypt the data in the message. The cryptographic key is sometimes referred to herein as a key. The server may send a message including encrypted data to the client in a similar manner.

Different types of data sharing protocols use different encryption protocols and keys. For example, according to an asymmetric key encryption protocol, the server has a public key and a private key. The public key is used for encrypting data. The private key may be capable of use for decrypting data that has been encrypted using the public key. The server may share its public key and keep its private key secret. In the example exchange described above, the client may use the server's public key to encrypt the message. After receiving the message, the server may decrypt the encrypted message using its private key. In some examples, both devices may have sets of public and private keys, allowing two-way encrypted communications. In a symmetric encryption protocol, both the client and the server may be in possession of a common key, which is kept secret and used to both encrypt and decrypt messages. In some examples discussed herein, both symmetric and asymmetric protocols may be used. For example, the Transport Layer Security (TLS) protocol and its predecessor Secure Sockets Layer (SSL) utilize an asymmetric protocol to exchange a symmetric key between devices. Once exchanged, the symmetric key is used for subsequent communications between the devices.

In many secure communication examples, it is desirable to authenticate the devices as well as to keep communications between the devices secret. Authentication occurs when one or both devices verify the identity of the other. Authentication may mitigate the risk of Man-In-The-Middle (MITM) attacks. In a MITM attack, a third third-party device intercepts and reads encrypted messages by posing as either the server or the client. MITM attacks can be prevented by authenticating the identity of one or both of the devices before sensitive data is exchanged.

Various mechanisms are used for authentication. For example, in some instances authentication may be performed utilizing a certificate authority or other trusted device. The server may demonstrate its identity to the certificate authority, for example, by providing corporate registration papers, an address, or other identifying information to the certificate authority. The certificate authority then creates a digital certificate for the server by cryptographically signing, with the certificate authority's private key, data associating the public key of the server to the server. The server may provide the digital certificate to the client in order to authenticate the server. In some examples, the client may authenticate itself to the server in the same way by obtaining its own digital certificate from the certificate authority and providing the digital certificate to the server.

In some examples, it is desirable to establish a secure connection between devices without the use of a certificate authority. For example, the client may be a remote control and the server may be a device to be controlled using the remote control such as a media player, cable box, television, etc. (Alternately, the role of the client and server may be reversed, as described herein.) In such an implementation, it may not be desirable to use a certificate authority to verify the identity of the remote control or controlled device because of computing limitations of the remote control or controlled device, for example. In other examples, various protocols described herein may be used to establish encrypted and authenticated communication between mobile phones or other Internet-of-things (IoT) devices. Some encrypted communication protocols include features that facilitate authentication without the use of a certificate authority. For example, some versions of the TLS support native pre-shared key (PSK) authentication in which the TLS library includes JPAKE support. According to native PSK authentication, the client and the server possess common data (e.g., a pre-shared key) before a communication of encrypted data begins. The pre-shared key may be used as a symmetric key for encrypted data communication between the devices and/or may be used to generate such a symmetric key.

Not all encrypted communication protocols, however, include native PSK support or similar authentication. For example, some devices, such as remote controls, may not utilize encrypted communication protocols or may utilize versions of encrypted communication protocols that do not include native PSK support. Additionally, client-side application developers may be unauthorized or unable to change the platform for which they are developing client-side devices in order to include native PSK support. Various examples described herein may address this concern by utilizing an encrypted communication protocol, such as TLS, in conjunction with a separate password authenticated key exchange protocol, such as JPAKE. For example, the client and server may conduct a JPAKE key exchange based on a password known to the client and the server. For example, the password may be passed from the server to the client utilizing a communication medium distinct from the network connection between the client and the server (e.g., an alternate medium). For example, the server may cause the password to be shown on a display of the server. A user of the client may view the password on the display and manually enter it using a user interface of the client. Also, in some examples, the pre-shared key may be transmitted utilizing an ultrasonic signal, a Bluetooth medium, a Near Field Communication (NFC) medium, etc. The client and server may use the password to generate a symmetric key that is subsequently used by the devices to authenticate one another.

FIG. 1 is a diagram showing one example of an environment 5 for establishing encrypted data communication between devices utilizing a password authenticated key exchange. FIG. 1 shows a client 10, a server 20, and a timing diagram 12 showing messages exchanged between the client 10 and the server 20. The client 10 may be any suitable type of computing device or application executing on a computing device. For example, the client 10 may be a remote control, a mobile computing device, a laptop computing device, a desktop computing device, a set-top media box, a television, a radio, a mobile phone, a camera, etc. Also, in some examples, the client 10 may be a software application executing on a computing device, such as a general purpose computer. Similarly, the server 20 may be any suitable type of computing device or application executing at a computing device.

The client 10 and server 20 may be in communication with one another via a network 64 and an alternate medium 66. In some examples, the network 64 is a packet-switched network. For example, below the application layer, the network 64 may operate according to the TCP/IP protocol or another suitable protocol. Any suitable application layer protocol may be used including, for example, HyperText Transfer Protocol (HTTP) or HyperText Transfer Protocol Secure (HTTPS) (e.g., after encrypted data communication has been established). The network 64 may be a wired network, a wireless network, or a mixed wired and wireless network. In some examples, the network 64 may be or comprise a Local Area Network (LAN). Referring to the remote control example above, a server or client that is a remote control may communicate with a server or client that is a set-top box or other remote controlled device using a LAN implemented by the user's local router, such as a wireless router. Also, in some examples, the network 64 may be or comprise a Wide Area Network such as, for example, the Internet.

The alternate medium 66 may comprise any suitable communication mechanism for communicating password data between the client 10 and the server 20. In some examples, the alternate medium 66 may be restricted to minimize or eliminate the possibility of other devices (e.g., devices other than the client 10 and server 20) intercepting the data sent via the alternate medium 66. For example, the password data may be sent unencrypted or as clear text ("in-the-clear"). In some examples, the alternate medium 66 may utilize a display device at either the server 20 or the client 10 and a keyboard, touchscreen, or other input device at the other device (e.g., either the client 10 or the server 20). For example, one device may display the password data on the display device. A user of the other device may view the password data displayed by the display device and manually enter it into the other device via the input device. In some examples, the alternate medium 66 may utilize a speaker and microphone or other sound sensor of the device. For example, one device may utilize the speaker to generate an audible or inaudible signal with the password data modulated thereon. The other device may receive the signal from the speaker via the microphone and demodulate the signal to generate the password data. Other suitable alternate mediums 66 may utilize a Bluetooth connection, a Near Field Communications (NFC), an infrared communication link, a Universal Serial Bus (USB) or other wired connection link, or any other suitable link different than the network 64. In various examples, the network 64 may provide faster and/or more reliable communication between the client 10 and the server 20 than the alternate medium 66. For example, it may be desirable to use the alternate medium 66 to authenticate the devices 10, 20, as described herein, to enable secure communication via the network 64.

The timing diagram 12 shows an example set of messages between the client 10 and the server 20 for establishing authenticated, encrypted data communication between the devices 10, 20. The client 10 may send a connection request message 30 to server 20 via the network 64. The connection request message 30 may include data indicating a request by the client 10 to establish a encrypted data communication with the server 20. The message 30 may be sent via the network 64. The connection request message 30 may be configured according to any suitable encrypted connection protocol. In some examples, the connection request message 30 is or includes data formatted according to the TLS protocol.

In response to the connection request message 30, the server 20 may send a data token message 40 to the client 10. The data token message 40 may comprise a data token that may be used by the client 10 and server 20 for authentication as described herein. In some examples, the connection request message 30 and data token message 40 may be configured according to the TLS Self Signed Certificate (TLS-SSC) protocol extension. For example, upon receiving the connection request message 30, the server 20 may generate a self-signed certificate. For example, the server 20 may generate a public key and a private key in any suitable manner. The server 20 may utilize the private key to generate the self-signed certificate. For example, the self-signed certificate may associate the server's public key to the server 20. Because the certificate is self-signed, it may not provide meaningful authentication of the server 20. In some examples, the data token included in the data token message 40 may be, or include, the self-signed certificate. Also, in some examples, the data token message 40 may include the public key of the server 20 as the data token or in addition to the data token.

Following receipt of the data token message 40, the client 10 and server 20 may perform a password authenticated key exchange 50, such as a JPAKE exchange described herein.

The exchange 50 may utilize both the network 64 and the alternate medium 66, as described herein. According to the key exchange 50, one device 10, 20 may send password data to the other device 10, 20 via the alternate medium 66. The password data may be or include any data suitable for transmission between the devices 10, 20 via the alternate medium 66. In some examples, the password data may be or comprise a short string of alphanumeric characters (e.g., four, six, or other small number of characters) suitable for display and entry at the devices 10, 20. Such a string of alphanumeric characters may be referred to as a personal identification number ("PIN"). In examples where the alternate medium 66 does not require a user to manually view and enter the password data, for example, more complex password data may be used, such as, for example, a longer string of alphanumeric characters.

In some examples, the password authenticated key exchange 50 may also include one or more additional messages exchanged between the devices 10, 20. The additional messages may include values derived from the password data and other values. The additional messages may be communicated via the network 64. In some examples, the additional messages of the key exchange 50 may transmitted utilizing the HTTP application layer protocol and according to a representational state transfer (REST) compliant application programming interface (API). Based on the password data and, in some examples, values exchanged in the additional messages, the client 10 and the server 20 may independently derive a session key. The session key may be used by the devices to authenticate one another, as described herein. For example, if the server 20 receives from the client 10 a version of the session key that matches its own version of the session key, it may conclude that the client 10 that sent the session key is the same client 10 with whom it conducted the key exchange 50. Also, in some examples, the key exchange 50 may be omitted if the client 10 and server 20 have previously conducted a key exchange (e.g., for a previously established encrypted data communication channel). If this is the case, and if both devices 10, 20 retain a copy of the previous session key derived from the previous key exchange, then key exchange 50 may be omitted and the previous session key may be used instead. In some examples, if client 10 and server 20 previously conducted a key exchange, client 10 may omit key exchange 50 and may not require storage of the previously generated session key. Instead, client 10 may store data that indicates that server 20 is associated with a previously authenticated public key. In an example, client 10 may perform a lookup using the public key sent by server 20. If the results of the lookup indicate that server 20 was previously authenticated via a password authenticated key exchange, client 10 and server 20 may open an encrypted data communication channel 80, such as a TLS connection without performing actions 50, 60, and 61 of timing diagram 12.

When both devices have a copy of the session key, the client 10 may generate a message authentication code (MAC). For example, the client 10 may generate the MAC by encrypting or otherwise cryptographically signing the data token (received by the client 10 from the server 20 at the data token message 40) with the session key from the key exchange 50. In some examples, the client 10 may utilize a keyed-hash message authentication code (HMAC) to encrypt the data token with the session key to produce the MAC. The client may send to the server 20 a MAC message 60 that includes the MAC. The MAC message 60 may be sent via the network 64. The server 20 may receive the MAC message 60 and may perform a suitable cryptographic operation to verify that the MAC received from the client was generated from the session key from the key exchange 50. For example, the server 20 may independently generate a second MAC from the session key in the same manner as the client 10. If the second MAC generated by the server 20 is not equivalent to the first MAC received from the client 10 with the MAC message 60, the client 10 may not be authenticated to the server 20 and the server 20 may refuse the connection request sent in the connection request message 30. If the server determines that the second MAC generated by the server 20 matches the first MAC received from the client 10 with the MAC message 60, this may authenticate the client 10 to the server 20. Accordingly, the server 20 may send a connection success message 70 to the client 10 and encrypted data communication, such as through a TLS connection 80 may be established.

In some examples, described herein, the client 10 may be programmed to generate and send one or more dummy MAC messages 61 (not shown in FIG. 1) before sending the MAC message 60. A dummy MAC message 61 may be similar to the MAC message 60, but may include an incorrect MAC (e.g., a MAC that is not correctly derived from the session key of the key exchange 50). The dummy MAC message or messages 61 may be used to authenticate the server 20 to the client 10. For example, client 10 may send dummy MAC message or messages 61 to ensure that server 20 is checking MACs and not indiscriminately accepting MACs as valid. Knowledge that server 20 is genuinely checking MACs provides assurance to client 10 that subsequent data sent by client 10 to server 20 will be protected. For example, a third party device may be able to impersonate the server 20 and thereby launch a MITM attack by intercepting the MAC message 60 and replying to the client 10 with a fraudulent connection success message. To avoid this, the client 10 may send one or more dummy MAC messages 61. If a third party device purporting to be the server 20 accepts a dummy MAC message 61, it may indicate to the client 10 that the responding device is not the server 20 and that data sent to an endpoint device in the communication channel may not be protected. Accordingly, the client 10 may decline to establish a connection. In some examples, the client 10 may be programmed to send a randomly or pseudo-randomly generated number of dummy MAC messages 61. This may prevent the third party device from being able to fool the client 10 by rejecting a predetermined number of dummy MAC messages 61. Although in FIG. 1 and throughout the present disclosure, the communications of the timing diagram 12 are described as between a client 10 and a server 20, in some examples, the devices may be named differently. For example, the actions described as being performed by the client 10 may be described as being performed by a server and the actions described as being performed by the server 20 may be described as being performed by a client. Further, alternate names for the devices may be used, such as: first party and second party, A and B, etc.

Figure 2:
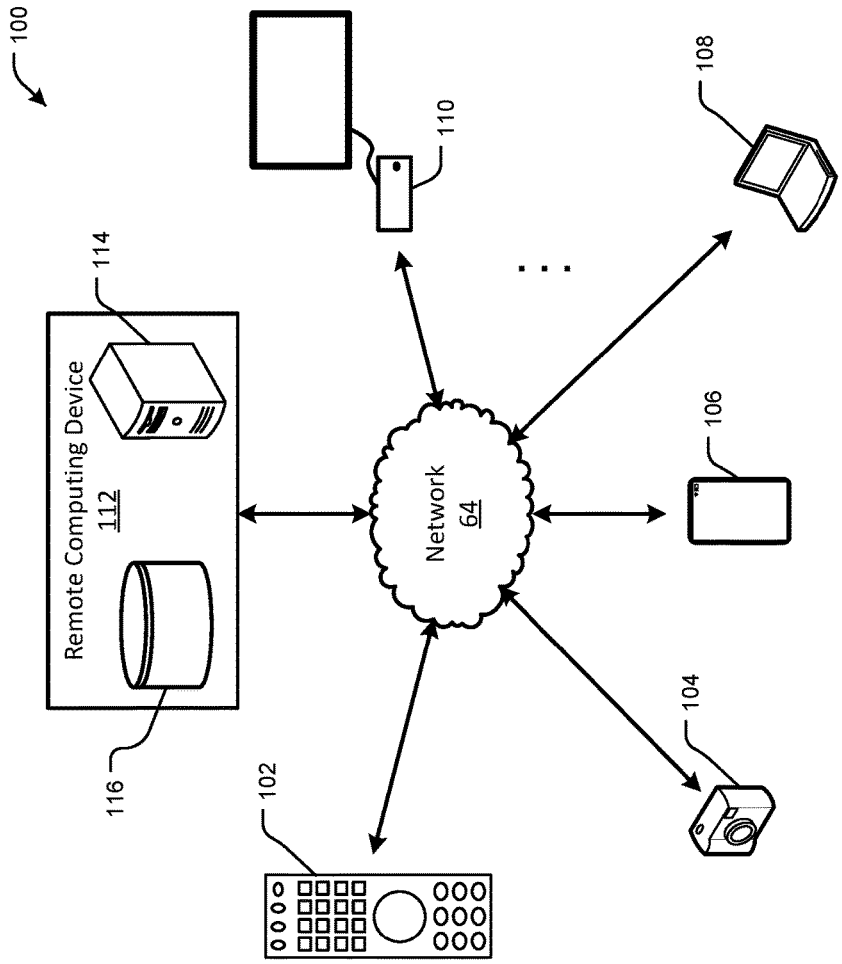
FIG. 2 is a diagram showing one example of an environment for establishing an encrypted connection between devices utilizing a password authenticated exchange.

FIG. 2 is a diagram showing one example of an environment 100 for establishing encrypted data communication between devices utilizing a password authenticated exchange. The environment 100 includes several example computing devices that may be and/or may execute either the client 10, the server 20, or both. The example computing devices 102, 104, 106, 108, 110, 112 shown in FIG. 2 are in communication with one another via the network 64. The computing devices 102, 104, 106, 108, 110, 112 may also be in communication with other computing devices 102, 104, 106, 108, 110, 112 via an alternate communication medium, such as alternate medium 66 (not shown in FIG. 2). Although particular computing devices 102, 104, 106, 108, 110, and 112 are depicted in FIG. 2 and described below, different types of computing devices may be used without departing from the spirit of the disclosure. For example, any computing devices configured to communicate with other computing devices over a network (e.g., Internet of Things devices) may be used in accordance with the protocols, systems, and methods described herein. In some examples, computing devices which may be used in accordance with the protocols, systems, and methods described herein may include automobiles, thermostats, appliances, lighting systems, heating/cooling devices, and/or other household goods with integrated networking technology.

An example media player computing device or media player 110 may be connected to a television or other suitable media device for playing back audio, video, or other media. The media player 110 may comprise a processor and associated data storage. The media player 110 may also comprise suitable input/output devices such as, switches or buttons for activating and/or configuring the media player 110, a display for providing a status of the media player 110, etc. The media player 110, in some examples, may store media data and/or may download media data from a remote computing device, such as remote computing device 112. Media data stored and/or downloaded to the media player 110 may be displayed at a television or other suitable output device.

An example remote control computing device or remote control 102 may be utilized to control the media player 110 or any other suitable computing device of the environment 100, or other computing device. The remote control computing device 102 may comprise a processor and associated data storage. The remote control computing device 102 may also comprise a plurality of buttons or switches that allow a user to input commands. Commands inputted to the remote control 102 may be encrypted and transmitted to another computing device (e.g., a computing device to be controlled) via an authenticated and secure communication channel, as described herein.

An example digital camera computing device or digital camera 104 may be any suitable device configured to capture an image and/or video. The digital camera 104 may have one or more than one image sensor and may have a standard or panoramic field-of-view. In some examples, the digital camera 104 may be configured to communicate with other components of the environment 100 via the network 64 and/or via an alternate communication medium, such as 66 in FIG. 1. For example, the digital camera 104 may upload images and/or videos to the mobile device 106 or other component of the environment 100 for storage, processing, etc.

An example mobile device 106 may be any suitable type of computing device comprising a processor and data storage. In some examples, the mobile device 106 may comprise one or more image sensors and associated optics for capturing an image or video. In some examples, the mobile device 106 may be configured to communicate on a cellular or other telephone network in addition or instead of the network 64. Also, in some examples, the mobile device 106 may be configured to access the network 64 via the cellular or other telephone network. An example other computing device 108 may be any suitable type of computing device comprising a processor and data storage including, for example, a laptop computer, a desktop computer, etc. In some examples, the computing device 108 may comprise one or more image sensors and associated optics for capturing an image or video.

The remote computing device 112 may be any suitable computing device for performing actions remote from the other computing devices of the environment 100. The remote computing device may comprise one or more processing devices 114, such as servers, and one or more data stores 116. Processing devices 114 and data stores may be located at a single physical location or may be physically and/or geographically distributed. For example, the remote computing device 112 may be implemented as a cloud device utilizing multiple, distributed servers or other computing devices. The remote computing device 112 may perform any suitable task in the environment 100. In some examples, the remote computing device 112 may be a media server that provides media data to the media player 110, mobile device 106 other suitable component. Also, in some examples, the remote computing device may be a remote image processor that performs image processing on images or video captured by the various computing devices of the environment 100. Other suitable functions for the remote computing device are also envisioned.

Figure 3:
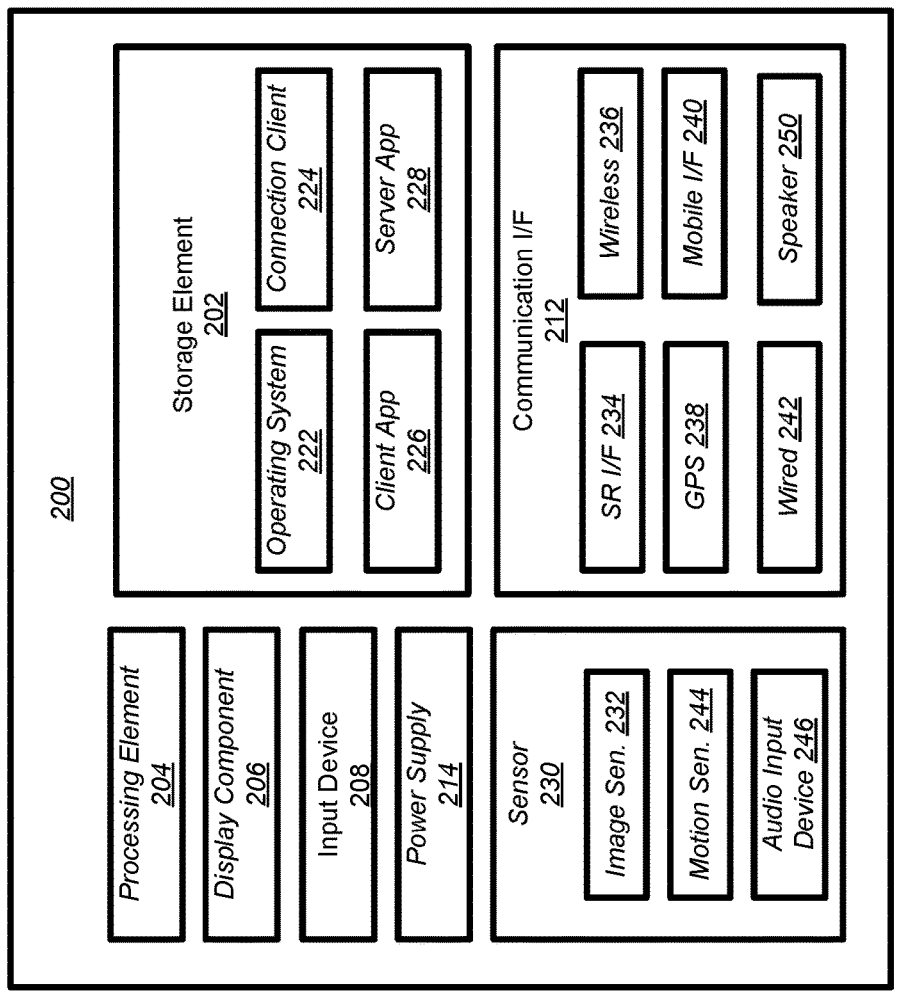
FIG. 3 is a block diagram showing an example architecture of a computing device.

FIG. 3 is a block diagram showing an example architecture 200 of a computing device such as client 10 and/or server 20. For example, the architecture 200 may describe some or all of the computing devices of the environment 100. In some examples, the computing devices of the environment 100 may be referred to herein as display devices, input devices, and/or output devices. It will be appreciated that not all computing devices will include all of the components of the architecture 200 and some computing devices may include additional components not shown in the architecture 200.

The architecture 200 may include one or more processing elements 204 for executing instructions and retrieving data stored in a storage element 202. The processing element 204 may comprise at least one processor. Any suitable processor or processors may be used. For example, the processing element 204 may comprise one or more digital signal processors (DSPs). The storage element 202 can include one or more different types of memory, data storage or computer readable storage media devoted to different purposes within the architecture 200. For example, the storage element 202 may comprise flash memory, random access memory, disk-based storage, etc. Different portions of the storage element 202, for example, may be used to store program instructions for execution by the processing element 204, storage of frames or other digital works, and/or a removable storage for transferring data to other devices, etc. An operating system 222 may provide the user with an interface for operating the computing device and may facilitate communications and commands between applications executing on the architecture 200 and various hardware thereof. A connection client 224 may be programmed to execute an authenticated communication channel, as described herein. For example, the connection client 224 may be programmed to send and/or receive the various messages described herein, to conduct a password authenticated key exchange, as described herein, etc. Also, in some examples, the storage element 202 may comprise instructions for executing a client application 226 and/or a server application 228 for executing the client and/or server side of an authenticated communication channel, as described herein.

When implemented in some computing devices, such as a display device, the architecture 200 may also comprise a display component 206. The display component 206 may comprise one or more light emitting diodes (LEDs) or other suitable display lamps. Also, in some examples, the display component 206 may comprise, for example, one or more devices such as cathode ray tubes (CRTs), liquid crystal display (LCD) screens, gas plasma-based flat panel displays, LCD projectors, or other types of display devices, etc. As described herein, the display component 206 may form part of the alternate communication medium 66. For example, the computing device 200 (e.g. server application 226) may display the password data at the display component 206. Also, in some examples, a display component 206 may include a speaker or other audio output device for generating an audiable or inaudible audio signal with password data modulated thereon.

The architecture 200 may also include one or more input devices 208 operable to receive inputs from a user. The input devices 208 can include, for example, a push button, touchpad, touch screen, wheel, joystick, keyboard, mouse, trackball, keypad, light gun, game controller, microphone or any other such device or element whereby a user can provide inputs to the architecture 200. These input devices 208 may be incorporated into the architecture 200 or operably coupled to the architecture 200 via wired or wireless interface. When the display component 206 includes a touch sensitive display, the input devices 208 can include a touch sensor that operates in conjunction with the display component 206 to permit users to interact with the image displayed by the display component 206 using touch inputs (e.g., with a finger or stylus). As described herein, the input device 208 may form part of the alternate communication medium 66. For example, when the computing device 200 is or executes a client, such as client 10, another device may display the password data. A user of the computing device 200 may see the password data and enter it to the computing device 200 via an input device 208. The architecture 200 may also include a power supply 214, such as a wired alternating current (AC) converter, a rechargeable battery operable to be recharged through conventional plug-in approaches, or through other approaches such as capacitive or inductive charging.

The architecture 200 may also include a communication interface 212, comprising one or more wired or wireless components operable to communicate with one or more other user devices. For example, the communication interface 212 may enable the computing device 200 to communicate via the network 64 and/or the alternate communication medium 66. The communication interface 212 may comprise a wireless communication module 236 configured to communicate on a network, such as the network 64, according to any suitable wireless protocol, such as IEEE 802.11 or another suitable wireless local area network WLAN protocol. A short range interface 234 may be configured to communicate using one or more short range wireless protocols such as, for example, near field communications (NFC), Bluetooth, Bluetooth LE, etc. A mobile interface 240 may be configured to communicate utilizing a cellular or other mobile protocol. A Global Positioning System (GPS) module 238 may be in communication with one or more earth-orbiting satellites or other suitable position-determining systems to identify a position of the architecture 200. A wired communication module 242 may be configured to communicate according to the Universal Serial Bus (USB) protocol or any other suitable protocol. In various examples, the communication interface 212 may include a speaker 250. Speaker 250 may be effective to produce sonic signals at various frequencies. In some examples, speaker 250 may be part of the alternate communication medium 66, and may produce audible, subsonic, and/or ultrasonic signals of password data used in a JPAKE key exchange.

The architecture 200 may also include one or more sensors 230 such as, for example, one or more image sensors and one or more motion sensors. Some examples of the architecture 200 may include multiple image sensors 232. In some examples, one or more image sensors 232 may capture video data. Motion sensors 244 may include any sensors that sense motion of the architecture including, for example, gyroscopes and accelerometers. A gyroscope may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. An accelerometer may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 238 may be utilized as a motion sensor. For example, changes in the position of the architecture 200, as determined by the GPS interface 238, may indicate the motion of the GPS interface 238. Other types of motion sensors that may be included in the architecture 200 include digital compass sensors, other location sensors (e.g., utilizing beacon signals or time stamps to determine a current or past location of the architecture), time-of-flight or other depth sensors, etc. In some examples, an image sensor may also be a motion sensor. In addition to motion sensors, some examples of the architecture 200 include an audio input device 246. In various examples, audio input device 246 may be a microphone or other audio transducer. The audio input device 246, for example, may be a part of the alternate communication medium 66. For example, when the architecture 200 is or is executing a client device, the audio input device 246 may receive a signal with the password data modulated thereon. The processing element 204 may be programmed to demodulate the received signal to determine the password data.

Figure 4:
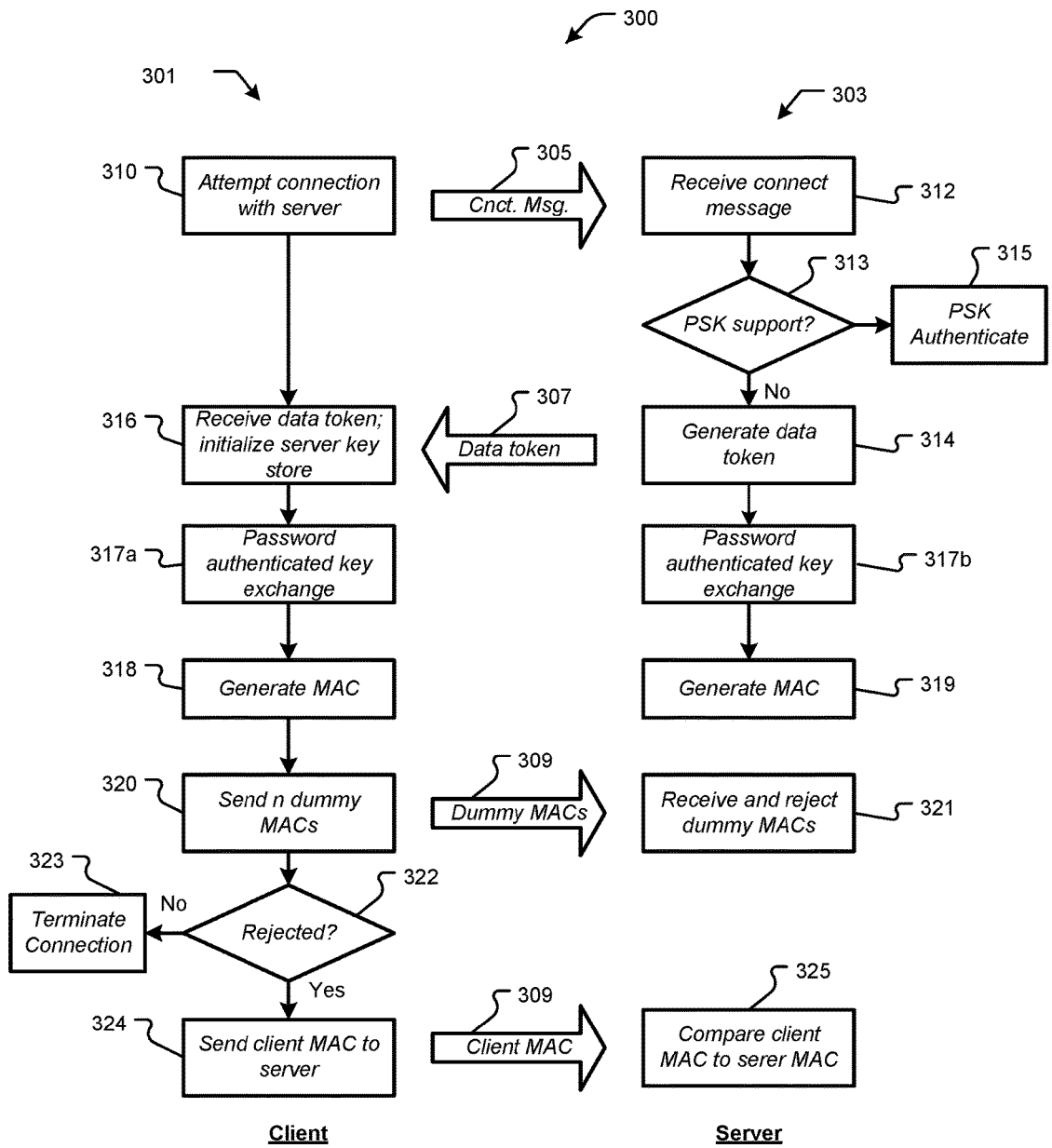
FIG. 4 is a flow chart showing one example of a process flow that may be executed by a client and a server to establish an encrypted connection using a password authenticated key exchange.

FIG. 4 is a flow chart showing one example of a process flow 300 that may be executed by a client and a server to establish encrypted data communication using a password authenticated key exchange. The client and server described with respect to FIG. 4 may be similar to the client 10 and server 20 described herein. The flow chart of FIG. 4 has two columns. A column 301 includes actions performed by the client. A column 303 includes actions performed by the server. The actions of the process flow 300 may represent a series of instructions comprising computer readable machine code executable by a processing unit of a computing device. In various examples, the computer readable machine codes may be comprised of instructions selected from a native instruction set of the computing device and/or an operating system of the computing device.

At action 310, the client may attempt to establish a connection with the server. For example, the client may send a connection request message 305. The connection message 305 may be similar to the connection request message 30 described above. For example, the connection request message 305 may comprise data indicating a request by the client to establish encrypted data communication with the server. In some examples, the connection request message 305 may comprise data indicating whether the client includes native pre-shared key (PSK) authentication support. For example, server 20 may send a PSK identity hint to client 10. Client 10 may use the PSK identity hint to identify a previously-stored session key. If the client and the server support native PSK authentication, it may not be necessary to perform a password authenticated key exchange, as described.

The server may receive the connection request message 305 at action 312. Optionally, at action 313, the server may determine whether the client supports native PSK authentication. For example, if the client supports native PSK authentication, the server may proceed to open the requested encrypted data communication channel at action 315 utilizing native PSK authentication. The server may determine whether the client supports native PSK authentication considering the connection request message 305, as the connection request message 305 may include data indicating whether the client supports native PSK authentication. In some examples, the server may determine whether the client supports native PSK authentication considering, at least in part, a port at the server to which the client directs the connection request message 305. If the server determines that the client does not support native PSK authentication, then the server may proceed with the process flow 300 to authenticate the client utilizing a password authenticated key. In some examples, the server may proceed directly to action 314, where it may generate token data as described. In other examples, instead of proceeding directly to action 314, the server may decline the connection and send a message declining the connection to the client. In response to the message declining the connection, the client may send a second connection request message directed to a password authenticated key exchange port at the server.

At 314, the server may generate a data token and send a data token message 307 including the data token to the client. In some examples, the data token may be, or include, a self-signed certificate generated by the server. In some examples, the data token may be a random or pseudo-random number generated, for example, by the server. Also, in some examples, the data token message 307 may include a self-signed certificate in addition to the data token. In some other examples, the data token message 307 may include the public key of the server as the data token or in addition to the data token.

The client may receive the data token and, optionally, initialize a server key store at 316. The server key store may be located at a storage element of the client or the computing device executing the client. The client may store data tokens, password-authenticated keys, and/or MACs from different clients at the server key store. In this way, as described, the client may not need to perform a password authenticated key exchange with a server if it has already done so with that server previously. For example, if the client and server previously conducted a key exchange, client 10 may omit actions 317, 318, 319, 320, 321, 322, 323, 324, and 325 and may establish an encrypted data communication channel, such as a TLS connection, in response to action 312. In the example, the client may use a public key received from the server to perform a look-up of the server in a data structure used for server authentication. The data structure may be stored in a memory of the client device. The data structure may store information associating the server with the public key and with data that indicates that the server has been previously authenticated. Omitting actions 317, 318, 319, 320, 321, 322, 323, 324, and 325 in such examples, may conserve power and processing resources of the client device.

At actions 317a and 317b, the client and the server may optionally perform a password authenticated key exchange, for example, a JPAKE exchange. At the conclusion of the JPAKE exchange, the client and server may possess independently determined copies of a single password-authenticated key. In some examples, actions 317a and 317b may be omitted if the server and the client have previously performed a password authenticated key exchange. For example, the client and server may proceed with the process flow 300 utilizing the previously-determined password-authenticated key. In some examples, the client may store the password-authenticated key for the server at its server key store along with data associating the password-authenticated key with the server. In some examples, the server may also have a client key store and may store the password-authenticated key at its client key store along with data associating the password-authenticated key with the client. In some examples, the client and server may use a verification process to verify that each endpoint has generated the same password-authenticated key. For example, the client may send a cryptographic hash of the password-authenticated key (an "HKEY") to the server. The server may send a cryptographic hash of the client's HKEY (an "HHKEY") to the client. The client and server may use the different values received during the verification process (e.g., the HKEY and the HHKEY) to prove that the client and the server have each independently generated the same password-authenticated key. Such a verification process is useful in examples where the password authenticated key exchange 317a and 317b occurs over an unsecured communication channel.

At action 318, the client may generate a MAC utilizing its copy of the password-authenticated key, for example, as described herein. This may be referred to as the client MAC or client-generated MAC. At action 319, the server may also generate a MAC using its copy of the password-authenticated key, as described herein. This may be referred to as the server MAC or server-generated MAC. Because the client MAC and the server MAC are generated using the same process, they should be equal if they are generated from the same password-authenticated key.

At action 320, the client may send a number (n) incorrect or dummy MAC messages 309 to the server. Each dummy MAC message may comprise a dummy MAC. A dummy MAC may be any value that is not derived from the password-authenticated key. In some examples, a dummy MAC may be formatted to specifications similar to those of the client MAC. For example, the dummy MAC may be of the same size and/or format. The server may receive and reject the dummy MACs at 321. In some examples, the server may send the client a protocol message (not shown) indicating that the dummy MACs are rejected. In some other examples, the server may close the connection in response to receipt of an incorrect dummy MAC. In examples where the server closes the connection in response to receipt of an incorrect dummy MAC, the password authenticated key exchange actions 317a and 317b may be omitted in subsequent iterations of sending the n dummy MACs. Omitting the password authenticated key exchange may conserve power and processing resources of the client device. In various examples, the client device may determine that password authenticated key exchange action 317a may be by-passed based on the public key received from the server during set-up of an encrypted data communication channel with the server device. For example, the client may use a public key received from the server to perform a look-up of the server in a data structure used for server authentication. The data structure may be stored in a memory of the client device. The data structure may store information associating the server with the public key and with data that indicates that the client device has previously sent a number of dummy MAC messages a to server, where a<n. The client may continue to send dummy MACs and omit the password authenticated key exchange action 317a until n dummy MACs have been sent to the server. The number n may be determined in any suitable manner. For example, the client may randomly select the number n at each execution of the process flow 300.

At action 322, the client may determine whether the n dummy MACs sent at 320 were rejected by the server. If any of the n dummy MACs were accepted by the server, the client may terminate the connection at action 323. For example, if the server accepts any of the n dummy MACs, it may indicate that the server does not possess the password-authenticated key and is therefore unable to discern between a dummy MAC and the MACs generated at actions 318 and 319 from the password authenticated key. The indiscriminate acceptance of the dummy MACs as accurate may be an indicator that a MITM attack is occurring. Additionally, acceptance of any of the n dummy MACs may indicate that the server device is not checking the generated MAC against the server's independently generated MAC. Accordingly, the client device may determine that the communication channel is unprotected. The client may terminate the connection. If the n dummy MACs are rejected at action 322, the client may, at action 324, send to the server a MAC message 309 including the client-generated MAC. The server may receive the MAC message at 309. The server may compare the client MAC included with the MAC message to the server MAC at 325. If the client MAC matches the server MAC, the server may continue to initiate the encrypted data communication channel, for example, as described herein. In some examples, the server may not generate a server MAC. Instead, the server may decrypt the client MAC with the password-authenticated key to generate a data token. If the data token generated from the client MAC with the password-authenticated key matches the data token sent by the server to the client with data token message 307, the server may consider the client to be authenticated and may establish the encrypted communication channel.

Figure 5:
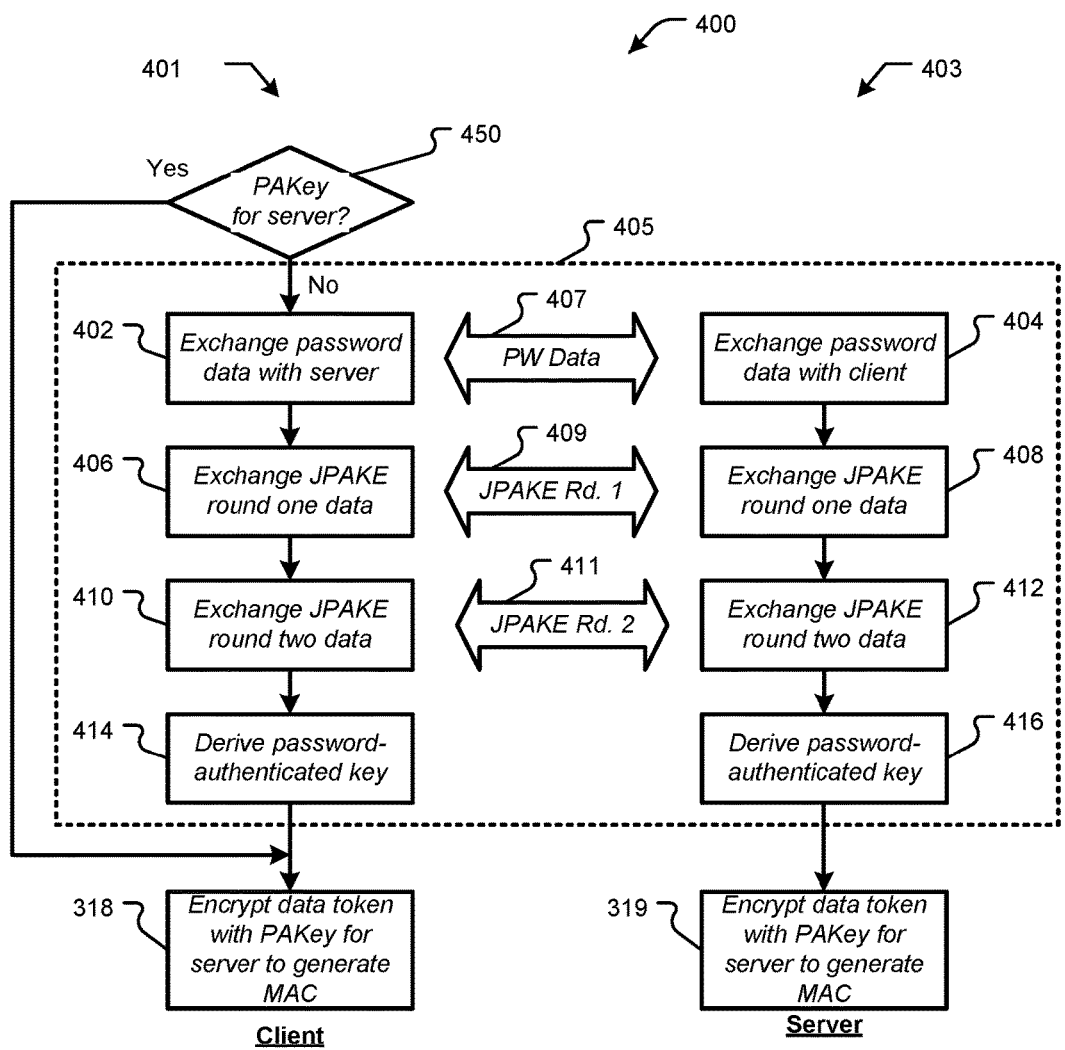
FIG. 5 is a flowchart showing one example of a process flow that may be executed by a client and a server to exchange and/or identify a password-authenticated key.

FIG. 5 is a flowchart showing one example of a process flow 400 that may be executed by a client and a server to exchange and/or identify a password-authenticated key. For example, the process flow 400 may be executed by the client and/or server to execute actions 318 and 319 from the process flow 300 described above. Like the process flow 300, the flow chart of FIG. 5 has two columns. A column 401 includes actions performed by the client. A column 403 includes actions performed by the server. The actions of the process flow 400 may represent a series of instructions comprising computer readable machine code executable by a processing unit of a computing device. In various examples, the computer readable machine codes may be comprised of instructions selected from a native instruction set of the computing device and/or an operating system of the computing device.

At action 450, the client may determine whether it has stored at a data store a password-authenticated key for the server. For example, the client may have previously executed a password-authenticated exchange, such as a JPAKE exchange with the server and may have stored a password-authenticated key for the server at a server key store for the client. If the client has a previously-stored password-authenticated key for the server, it may proceed to action 318, described above with respect to the process flow 300.

If, at action 450, the client determines that it does not have a password-authenticated key for the server, the client and server may execute a password-authenticated key exchange.

For example, in FIG. 5, the actions within the box 405 show one example of a JPAKE exchange between the client and the server. According to a JPAKE exchange, the client and the server may agree on a group G with generator integer g of prime order q in which the discrete log problem is hard. A hard discrete log problem may be described as a problem that cannot be solved in a period of time X, where X is greater than the amount of time for which the password-authenticated key derived in FIG. 5 is valid. The group G and generator integer g may, but need not be secret. For example, the client and the server may exchange one or more messages to agree on the group G and/or the integer g in the clear over the network 64.

At actions 402 and 404, the client and server may exchange password data 407 via the alternate communication medium 66, as described herein. At actions 406 and 408, the client and server may select and exchange JPAKE round one data 409. For example, the client may select a first client round one secret value $x_1$, where $x_1 \in_R [0, q-1]$. The client may also select a second client round one secret value $x_2$, where $x_2 \in_R [1, q-1]$. From the secret values, the client may generate client round one data. The client round one data may include, for example, $g^{x_1}$ and $g^{x_2}$ (e.g., generator integer g as a base value raised to the exponent of $x_1$ and $x_2$), along with zero-knowledge proofs of the exponents $x_1$ and $x_2$. Similarly, the server may select a first server round one secret value $x_3 \in_R [0, q-1]$. The server may also select a second server round one secret value $x_4 \in_R [1, q-1]$. The server may generate server round one data. The server round one data may include, for example, $g^{x_3}$ and $g^{x_4}$, along with zero-knowledge proofs of the exponents $x_3$ and $x_4$. In some examples, the client may utilize the zero-knowledge proofs provided by the server to verify the first server round one value $x_3$ and the second server round one value $x_4$. Similarly, the server may utilize the zero-knowledge proofs provided by the client to verify the first client round one value $x_1$ and the second client round one value $x_2$.

At actions 410 and 412, the client and server may exchange JPAKE round two data 411. For example, the client may determine client round two data A. For example, client round two data A may be given by Equation [1] below:

$$A = g^{(x_1+x_3+x_4)x_2 s} \quad [1]$$

In equation [1], s is the password data and/or a derivative thereof. The client may send the client round two data to the server. The server may generate server round two data B. For example, server round two data B may be given by Equation [2] below:

$$B = g^{(x_1+x_2+x_3)x_4 s} \quad [2]$$

In Equation [2], s is also the password data and/or a derivative thereof.

At action 414, the client may derive the password-authenticated key, K. For example, the client may derive the first server round one secret value $x_3$ and second server round one secret value $x_4$ from the server round one data and server round two B. Equation [3] below shows one example of how the client may derive the password-authenticated key K:

$$K = \left(\frac{B}{g^{x_2 x_4 s}}\right)^{x_2} = g^{(x_1+x_3)x_2 x_4 s} \quad [3]$$

At action 416, the server may similarly derive the password-authenticated key, K. For example, the server may derive the first client round one secret value $x_1$ and the second client round one secret value $x_2$, from the client round one data and the client round two data A. Equation [4] below shows one example of how the server may derive the password-authenticated key K:

$$K = \left(\frac{B}{g^{x_2 x_4 s}}\right)^{x_4} = g^{(x_1+x_3)x_2 x_4 s} \quad [4]$$

After deriving the password-authenticated key K, the client and server may proceed to actions 318 and 319 of the process flow 300, as described herein.

Figure 6:
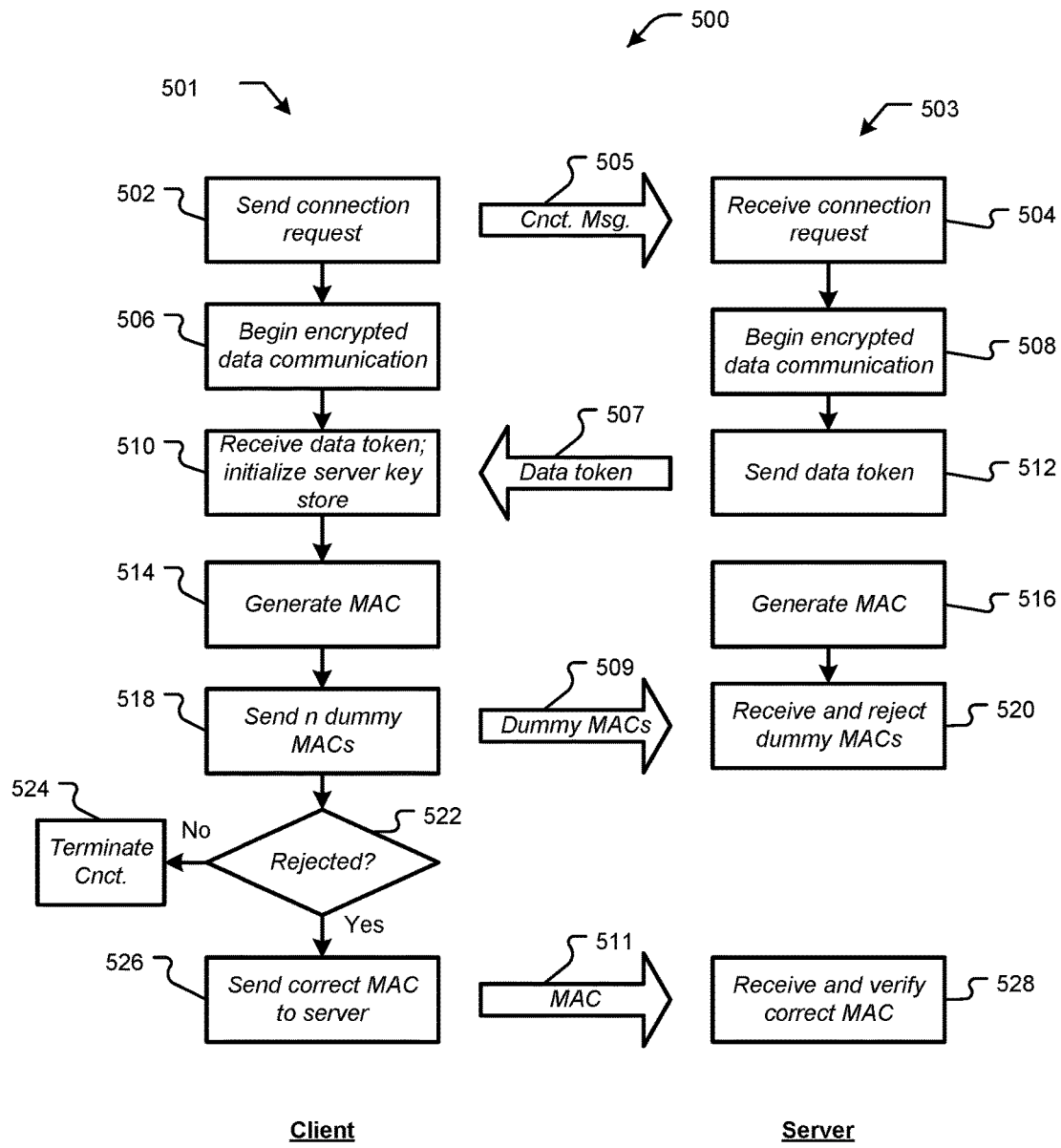
FIG. 6 is a flow chart showing one example of a process flow that may be executed by a client and a server to authenticate an established encrypted connection using a password authenticated key exchange.

In some examples, the server and client may enter into encrypted data communication, such as through a TLS connection, and then authenticate after entering the connection. FIG. 6 is a flow chart showing one example of a process flow 500 that may be executed by a client and a server to authenticate an established encrypted data communication channel using a password authenticated key exchange. The flow chart of FIG. 6 has two columns. A column 501 includes actions that may be performed by the client. A column 503 includes actions that may be performed by the server. At action 502, the client may send the server a connection request message 505. The server may receive the connection request message at action 504. At actions 506 and 508, the client and server may begin encrypted data communication. In some examples, encrypted data communication may be established through a TLS connection. The encrypted data communication begun at actions 506 and 508 may be secure, meaning that only the client and the server may read messages sent according to the established encrypted data communication protocol, even if sent over the network 64. The encrypted data communication begun at actions 506 and 508 may not be authenticated, however. For example, when encrypted data communication is established according to the TLS protocol, the server may establish the connection with a self-signed certificate.

At action 512, the server may send a data token message 507 including a data token to the client, which may receive the data token message 507 at 510. Optionally, the client may initialize a server key store. For example, actions 512 and 510 may be similar to actions 314 and 316 of the process flow 300 described above. The data token 507, however, may be sent according to the encrypted data communication established at actions 506 and 508. At actions 514 and 516, the client and server respectively may generate client and server MACs, similar to actions 318 and 319 of the process flow 300 described above. At 518, the client may send n dummy MAC messages 509 to the server, which may receive and reject the dummy MACs at 520. For example, actions 518 and 520 may be similar to actions 320 and 321 of the process flow 300. In contrast with the process flow 300, however, the dummy MAC messages 509 may be sent via the encrypted data communication begun at actions 506 and 508. At action 522, the client may determine if all of the dummy MAC messages 509 were rejected. If not, the client may, at action 524 terminate the encrypted data communication begun at 506 and 508. In other examples, instead of terminating the encrypted data communication begun at 506 and 508, the client may send a protocol message to the server, where the protocol message requests, for example, a MAC of the previously-derived password-authenticated session key derived by the server.

If all dummy MAC messages were rejected, the client may send the server a MAC message 511 including the correct client MAC. The action 526 may be similar to the action 324 of the process flow 300 except that the MAC message 511 may be sent via the encrypted data communication begun at actions 506 and 508. The server, at action 528, may receive the MAC message 309 and may compare the client MAC contained therein to its own server MAC. If the client and server MAC match, the server may continue the encrypted data communication begun at actions 506 and 508. Alternately, as described above with respect to action 325, the server may decrypt the client MAC to reveal a data token. If the revealed data token is the same data token sent to the client in data token message 307, the server may continue the encrypted data communication begun at actions 506 and 508.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flow charts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A system, comprising:
a server computing device comprising:
a first processor;
a first non-transitory computer-readable memory in communication with the first processor; and
a display device;
a client computing device comprising:
a second processor;
a second non-transitory computer-readable memory in communication with the second processor; and
an input device; and
wherein the system is programmed to:
send, by the client computing device and to the server computing device, a transport layer security (TLS) connection request message to the server;
send, by the server computing device and to the client computing device, a self-signed certificate encrypted with a private key of the server;
send, by the server computing device and to the client computing device, a first data token including a public key;
display, by the server computing device at the display device, a representation of password data;
receive, by the client computing device, the password data through the input device;
generate, by the client computing device, a first password-authenticated key using a password authenticated key exchange by juggling (JPAKE) protocol, wherein the password data is input to the JPAKE protocol to generate the first password-authenticated key;
generate, by the server computing device, a second password-authenticated key using the JPAKE protocol, wherein the password data is input to the JPAKE protocol to generate the second password-authenticated key;
encrypt, by the client computing device, the first data token with the first password-authenticated key to generate a first message authentication code (MAC);
encrypt, by the server computing device, the first data token with the second password-authenticated key to generate a second MAC;

send, by the client computing device to the server computing device, a MAC message comprising the first MAC;
determine, by the server computing device, that the first MAC is the same as the second MAC; and
establish, by the server computing device, a TLS connection to the client computing device.

2. The system of claim 1, wherein the system is further programmed to:
randomly or pseudo-randomly select, by the client computing device, a first number of dummy MAC messages;
before sending the MAC message, send, by the client computing device and to the server computing device, the first number of dummy MAC messages, wherein a first dummy MAC message of the first number of dummy MAC messages comprises a dummy MAC not equal to the MAC; and
determine, by the client computing device, that the server computing device did not establish the TLS connection in response to any of the first number of dummy MAC messages.

3. The system of claim 1, wherein the system is further programmed to:
select, by the client computing device, a first secret value;
select, by the client computing device, a second secret value;
generate a first client round one value, by the client computing device, by raising a generator integer to a first exponent equal to the first secret value;
generate a second client round one value, by the client computing device, by raising the generator integer to a second exponent equal to the second secret value;
select, by the server computing device, a third secret value;
select, by the server computing device, a fourth secret value;
generate a first server round one value, by the server computing device, by raising the generator integer to a third exponent equal to the third secret value;
generate a second server round one value, by the server computing device, by raising the generator integer to a fourth exponent equal to the fourth secret value;
send, by the client computing device and to the server computing device, the first client round one value;
send, by the client computing device and to the server computing device, the second client round one value;
send, by the server computing device and to the client computing device, the first server round one value;
send, by the server computing device and to the client computing device, the second server round one value;
determine, by the client computing device, the third secret value based on the first server round one value;
determine, by the client computing device, the fourth secret value based on the second server found one value;
determine, by the server computing device, the first secret value based on the first client round one value;
determine, by the server computing device, the second secret value based on the second client round one value;
determine, by the client computing device, a client round two value based on the generator integer, the first secret value, the second secret value, the third secret value, the fourth secret value, and the password data;
send, by the client computing device, the client round two value to the server computing device, wherein the server computer device generates the password-authenticated key based at least in part on the client round two value;

determine, by the server computing device, a server round two value based on the first secret value, the second secret value, the third secret value, the fourth secret value, and the password data; and send, by the server computing device, the server round two value to the client computing device, wherein the client computing device generates the password-authenticated key based at least in part on the server round two value.

4. The system of claim 1, wherein the system is further programmed to:

determine, by the server, that the client does not support native pre-shared key authentication based on a port to which the client directed the TLS connection request message; and after the server determines that the client does not support native pre-shared key authentication, generate, by the server, the self-signed certificate.

5. A system comprising:

a first device comprising at least one processor and at least one non-transitory computer-readable memory in communication with the at least one processor, wherein the first device is programmed to:

receive, from a second device, a message to encrypt future data sent to the second device;

send, to the second device via a first communication medium, first data comprising a self-signed certificate;

send, to the second device via an alternate communication medium, second data;

generate a key based at least in part on the second data;

encrypt the first data with the key to generate a first message authentication code (MAC);

receive, from the second device, a second MAC;

determine that the first MAC is equivalent to the second MAC;

generate third data that is encrypted; and send the third data to the second device.

6. The system of claim 5, wherein the first device is further programmed to:

receive from the second device a first second device's round one value;

determine a first secret value based at least in part on the first second device's round one value;

receive from the second device a second second device's round one value;

determine a second secret value based at least in part on the second second device's round one value;

generate a first first device's round one value based at least in part on a third secret value;

generate a second first device's round one value based at least in part on a fourth secret value;

send the first first device's round one value to the second device;

send the second first device's round one value to the second device;

determine a first device's round two value based at least in part on the first secret value, the second secret value, the third secret value, the fourth secret value, and the second data;

send the first device's round two value to the second device; and receive, from the second device, a second device's round two value, wherein the generate the key is also based at least in part on the second device's round two value.

7. The system of claim 5, wherein the first device is further programmed to:

determine that the second device does not support native pre-shared key authentication; and after the first device determines that the second device does not support native pre-shared key authentication, generate, by the first device, the self-signed certificate.

8. The system of claim 5, wherein the first device is further programmed to:

before receiving the second MAC, receive from the second device a dummy MAC;

determine that the dummy MAC does not authenticate the second device; and send to the second device a rejection message rejecting further data communication.

9. The system of claim 5, wherein the first device further comprises a display device, and wherein the first device is programmed to display a representation of the second data at the display device.

10. The system of claim 5, wherein the first device further comprises a speaker, and wherein first device is programmed to generate a representation of the second data with the speaker.

11. A method comprising:

sending, by a first device to a second device, a message to encrypt future data sent to the first device;

generating first encrypted data;

sending, by the first device, the first encrypted data to the second device via a first communication medium;

receiving, by the first device, first data from the second device, wherein the first data comprises a self-signed certificate;

receiving, by the first device and from the second device, second data, wherein the second data is received via an alternate communication medium distinct from the first communication medium;

generating, by the first device, a key based at least in part on the second data;

encrypting, by the first device and based at least in part on the key, the first data to generate a message authentication code (MAC); and sending, by the first device and to the second device, a MAC message, wherein the MAC message comprises the MAC.

12. The method of claim 11, further comprising sending the MAC message to the second device via the first communication medium.

13. The method of claim 11, further comprising establishing a secure communication channel in the first communication medium after the sending of the MAC message to the second device.

14. The method of claim 11, further comprising:

selecting, by the first device, a first secret value;

selecting, by the first device, a second secret value;

generating, by the first device, a first first device's round one value based at least in part on a generator integer and the first secret value;

generating, by the first device, a second first device's round one value based at least in part on the generator integer and the second secret value;

sending, by the first device, the first first device's round one value to the second device;

receiving, by the first device and from the second device, a first second device's round one value;

receiving, by the first device and from the second device, a second second device's round one value;

determining, by the first device, a third secret value based at least in part on the first second device's round one value;

determining, by the first device, a fourth secret value based at least in part on the second second device's round one value;

determining, by the first device, a first device's round two value based at least in part on the generator integer, the first secret value, the second secret value, the third secret value, the fourth secret value, and the second data;

sending, by the first device, the first device's round two value to the second device; and receiving, from the second device, a second device's round two value, wherein the generating of the key is also based at least in part on the second device's round two value.

15. The method of claim 11, wherein the second data comprises password data, further comprising receiving the password data via a keyed input device.

16. The method of claim 11, further comprising receiving a signal from a microphone of the first device.

17. The method of claim 11, further comprising:
generating, by the first device, a second device key store location; and
writing, by the first device and to the second device key store location, data associating the key to the second device;
sending, by the first device, a second encrypted connection request message to the second device;
receiving, by the first device, third data from the second device;
retrieving, by the first device and from the second device key store location, the key based at least in part on the data associating the key to the second device;
encrypting, by the first device and based at least in part on the key, the third data to generate a second MAC; and
sending, by the first device and to the second device, a second MAC message comprising the second MAC.

18. The method of claim 11, further comprising:
before sending the MAC message to the second device, sending, by the first device and to the second device, a first dummy MAC message comprising a first dummy MAC not equal to the MAC; and
determining, by the first device, that the second device failed to accept the first dummy MAC message.

19. The method of claim 11, further comprising:
randomly or pseudo-randomly selecting, by the first device, a first number of dummy MAC messages;
before sending the MAC message to the second device, sending, by the first device and to the second device, the first number of dummy MAC messages, wherein a first dummy MAC message of the first number of dummy MAC messages comprises a dummy MAC not equal to the MAC; and
determining, by the first device, that the second device failed to accept the first number of dummy MAC messages.

20. The method of claim 11, further comprising determining that the first data includes the self-signed certificate and a public key, wherein the self-signed certificate is signed by the second device.

* * * * *